(12) United States Patent
Schoeny

(10) Patent No.: US 9,901,033 B1
(45) Date of Patent: Feb. 27, 2018

(54) HARVESTER LOUVER WIRE RETENTION SYSTEM

(71) Applicant: Deere and Company, Moline, IL (US)

(72) Inventor: Jacob G. Schoeny, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/294,120

(22) Filed: Oct. 14, 2016

(51) Int. Cl.
*A01F 12/44* (2006.01)

(52) U.S. Cl.
CPC .......... *A01F 12/448* (2013.01); *A01F 12/446* (2013.01)

(58) Field of Classification Search
CPC .............................. A01F 12/446; A01F 12/448
USPC ........................... 209/394; 460/100, 101, 109
See application file for complete search history.

(56) References Cited

U.S. PATENT DOCUMENTS

| 3,800,803 | A | * | 4/1974 | Rouse | A01F 12/446 209/398 |
| 5,176,574 | A | * | 1/1993 | Matousek | A01F 12/446 209/394 |
| 5,462,174 | A | | 10/1995 | Truckenbrod et al. | |
| 6,053,812 | A | | 4/2000 | Loewen et al. | |
| 6,379,243 | B1 | * | 4/2002 | Schumacher | A01F 12/446 209/394 |
| 6,890,253 | B2 | | 5/2005 | Mammen et al. | |
| 7,997,967 | B2 | | 8/2011 | Ricketts et al. | |
| 9,149,002 | B2 | * | 10/2015 | Bischoff | A01F 12/446 |
| 9,198,359 | B2 | | 12/2015 | Adamson et al. | |
| 9,226,450 | B2 | | 1/2016 | Pearson et al. | |
| 9,258,945 | B2 | | 2/2016 | Pearson et al. | |
| 2003/0140612 | A1 | * | 7/2003 | Gorden | A01F 12/446 56/100 |

FOREIGN PATENT DOCUMENTS

| CN | 204377475 | 8/1995 |
| WO | WO9962325 | 12/1999 |

\* cited by examiner

*Primary Examiner* — Robert E Pezzuto
(74) *Attorney, Agent, or Firm* — Rathe Lindenbaum LLP

(57) ABSTRACT

A harvester cleaning system may include louvers, a bar, louver wires connected to the louvers and an adjustment arm. The bar may include spaced rails and rungs between the rails, wherein the rungs form pockets along the bar. Each of the louver wires may have a main portion about which the louver wire pivots and a lever portion received within one of the pockets. The adjustment arm may include slots receiving the lever portion of each of the louver wires, wherein the adjustment arm is movable to pivot the louver wires to pivot the louvers.

19 Claims, 6 Drawing Sheets

HARVESTER LOUVER WIRE RETENTION SYSTEM

BACKGROUND

Harvesters are used to gather a crop. Many harvesters utilize a sieve or cleaning shoe to separate grain or other wanted portions of a crop from chaff or other unwanted portions of the crop. The sieve or cleaning shoe may include louvers which are actuated to different positions to vary the crop filtering function carried out by the sieve. Such actuation may be carried out by rotating a louver wire connected to each of the louvers.

DETAILED DESCRIPTION OF EXAMPLES

Louver wires extend between louvers and facilitate rotation of the louvers to different spacings or angles to vary filtering characteristics of a sieve to accommodate different crops and to accommodate different crop or field conditions. Such louver wires are typically retained in place within the harvester by relatively complex retention systems. Such complex retention systems may be costly to manufacture and may make replacement or repair of the sieve or portions of the sieve difficult.

Disclosed herein are various examples of a louver wire retention system that may be less complex as compared to existing retention systems. The various example louver wire retention systems disclosed may be fabricated at a lower cost and may facilitate easier repair or replacement of portions of a harvester sieve. In one implementation, the harvester louver wire retention system may comprise a bar and an adjustment arm. The bar may include spaced rails and rungs between the rails, wherein the rungs form pockets along the bar. Each of the louver wires may have a main portion about which the louver wire pivots and a lever portion received within one of the pockets. The adjustment arm may include slots receiving the lever portion of each of the louver wires, wherein the adjustment arm is movable to pivot the louver wires.

In one implementation, the louver wire retention system may comprise a bar having opposite sides and slots, an adjustment arm and a retainer. Each of the louver wires may have a main portion received within one of the slots about which the louver wire pivots and a lever portion received between the opposite sides of the bar. The adjustment arm may have slots receiving the lever portion of each of the louver wires, wherein the adjustment arm is movable to pivot the louver wires. The retainer may sandwich the wires between the retainer and the bar, the retainer supporting the main portions within the slots.

In one implementation, the louver wire retention system facilitates a method for repairing or assembling portions of a harvester sieve. The method may comprise (1) inserting louver wires across a bar with main portions of the louver wires being received within downwardly facing slots of the bar and (2) releasably securing a retainer to the bar such that the retainer supports the louver wires within the downwardly facing slots.

Figure 1:
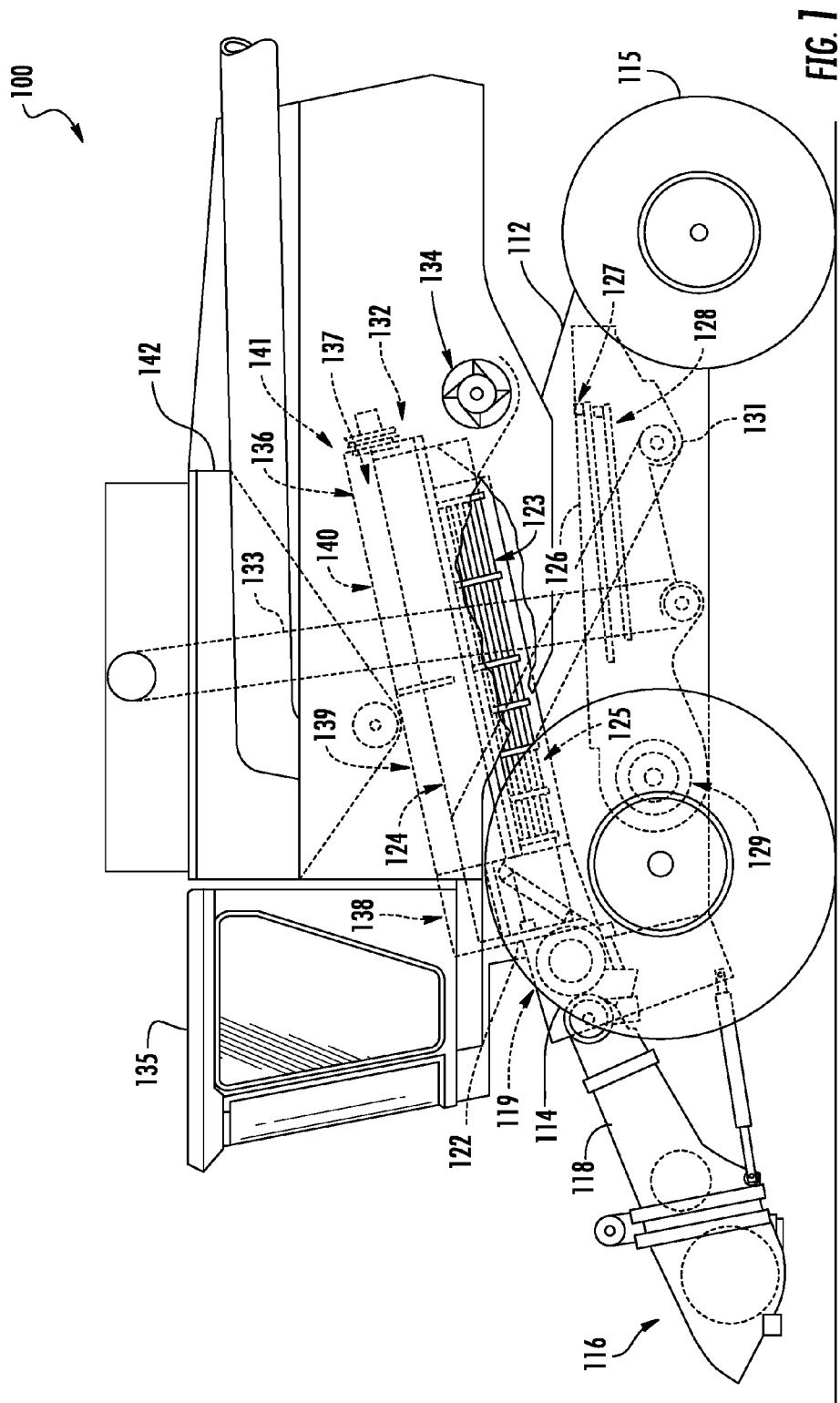
FIG. 1 is a diagram of an example harvester comprising an example cleaning system.

FIG. 1 is a diagram of an example harvester, in the form of a combine 100, including an example of the above described louver wire retention system. As shown by FIG. 1, combine 100 comprises a main frame 112 having wheel structure including front and rear ground engaging wheels 114 and 115 supporting the main frame for forward movement over a field of crop to be harvested. The front wheels 114 are driven by an electronically controlled hydrostatic transmission.

A vertically adjustable header or harvesting platform 116 is used for harvesting a crop and directing it to a feeder house 118. The feeder house 118 is pivotally connected to the frame 112 and includes a conveyor for conveying the harvested crop to a beater 119. The beater 119 directs the crop upwardly through an inlet transition section 122 to a rotary threshing and separating assembly 124. In other implementations, other orientations and types of threshing structures and other types of headers 116, such as transverse frame supporting individual row units, are utilized.

The rotary threshing and separating assembly 124 threshes and separates the harvested crop material. Grain and chaff fall through a concave 125 and separation grates 123 on the bottom of the assembly 124 to a cleaning system 126, and are cleaned by a chaffer 127, sieve 128 and air fan 129. The cleaning system 126 removes the chaff and directs the clean grain to elevator 133. Clean grain elevator 133 conveys the grain to tank 142. The clean grain in the tank 142 can be unloaded into a grain cart or truck by unloading auger. Tailings fall into the return elevator or auger 131 and are conveyed to the rotor 137 where they are threshed a second time.

Threshed and separated straw is discharged from the rotary threshing and separating assembly 124 through an outlet 132 to a discharge beater 134. The discharge beater 134, in turn, propels the straw out the rear of the combine. It should be noted that the discharge beater 134 could also discharge crop material other than grain directly to a straw chopper. The operation of the combine is controlled from an operator's cab 135.

In the example illustrated, the rotary threshing and separating assembly 124 comprises a cylindrical rotor housing 136 and a rotor 137 located inside the housing 136. The front part of the rotor and the rotor housing define the infeed section 138. Downstream from the infeed section 138 are the threshing section 139, the separating section 140 and the discharge section 141. The rotor 137 in the infeed section 138 is provided with a conical rotor drum having helical infeed elements for engaging harvested crop material received from the beater 119 and inlet transition section 122.

In the threshing section 139, the rotor 137 comprises a cylindrical rotor drum having a number of threshing elements, sometimes referred to as rasping bars, for threshing the harvested crop material received from the infeed section 138. Downstream from the threshing section 139 is the separating section 140 wherein the grain trapped in the threshed crop material is released and falls to the cleaning system 128.

Figure 2:
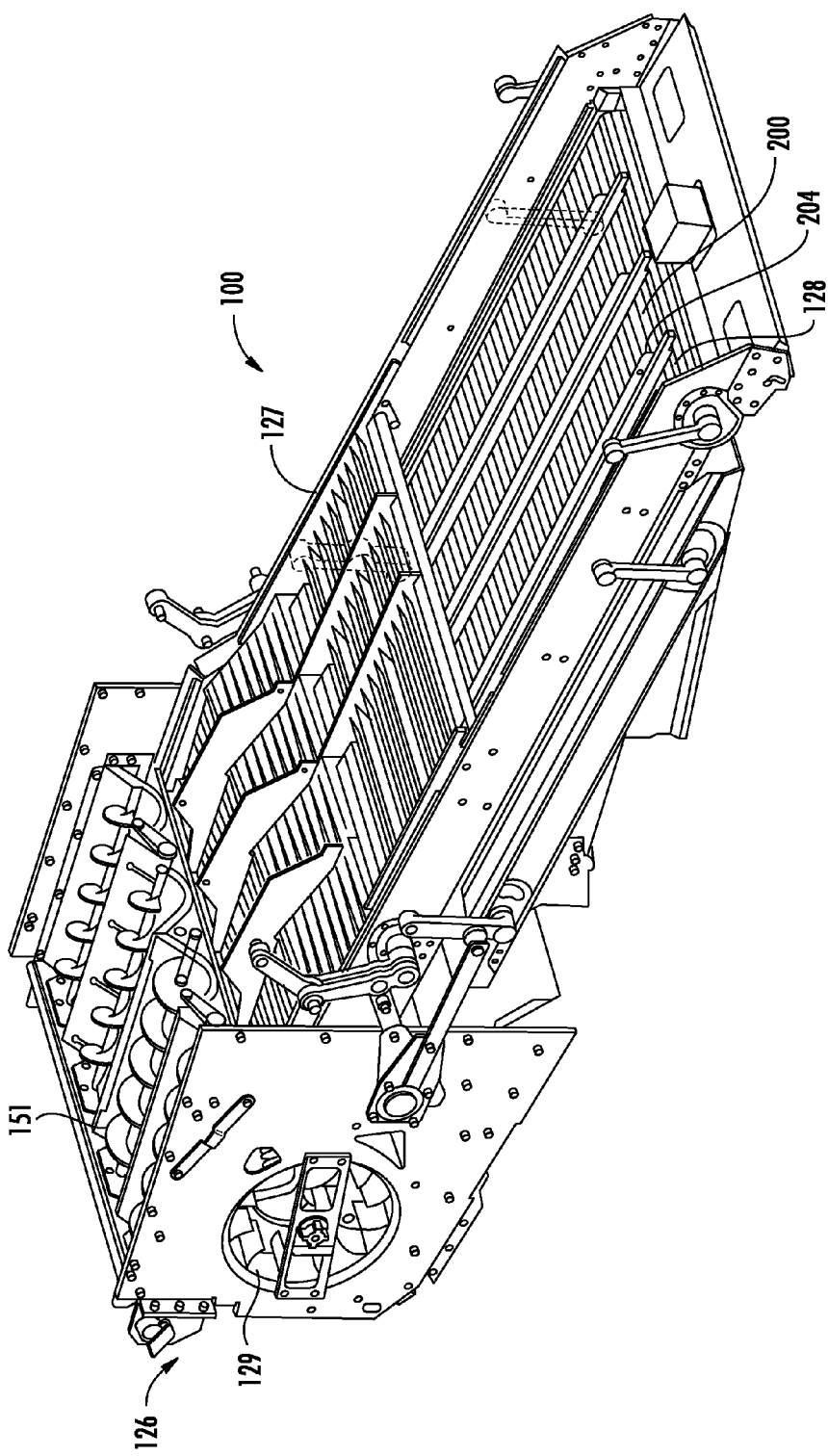
FIG. 2 is a rear perspective view of a portion of an example cleaning system of the harvester of FIG. 1.

FIG. 2 is a perspective view of cleaning system 126, sometimes referred to as a cleaning shoe, of harvester 100. FIG. 2 illustrates chaffer 127, sieve 128 and air fan 129 in more detail. As shown by FIG. 2, grain and chaff which has been threshed and which has fallen through concave 125 is conveyed by augers 151 to chaffer 127. Grain and chaff which has been threshed and which has fallen through separation grates 123 is deposited on chaffer 127. Chaffer 127, like sieve 128, is actuated back and forth in a reciprocating manner to filter clean and separate the grain from the chaff. Grain and chaff that passes through chaffer 127 is deposited upon sieve 128. Blower 129 directs air through sieve 128 to further discharge the lighter chaff toward the rear of harvester 100, whereas the clean grain passes through sieve 128 to the clean grain elevator 133 as shown in FIG. 1.

Figure 3:
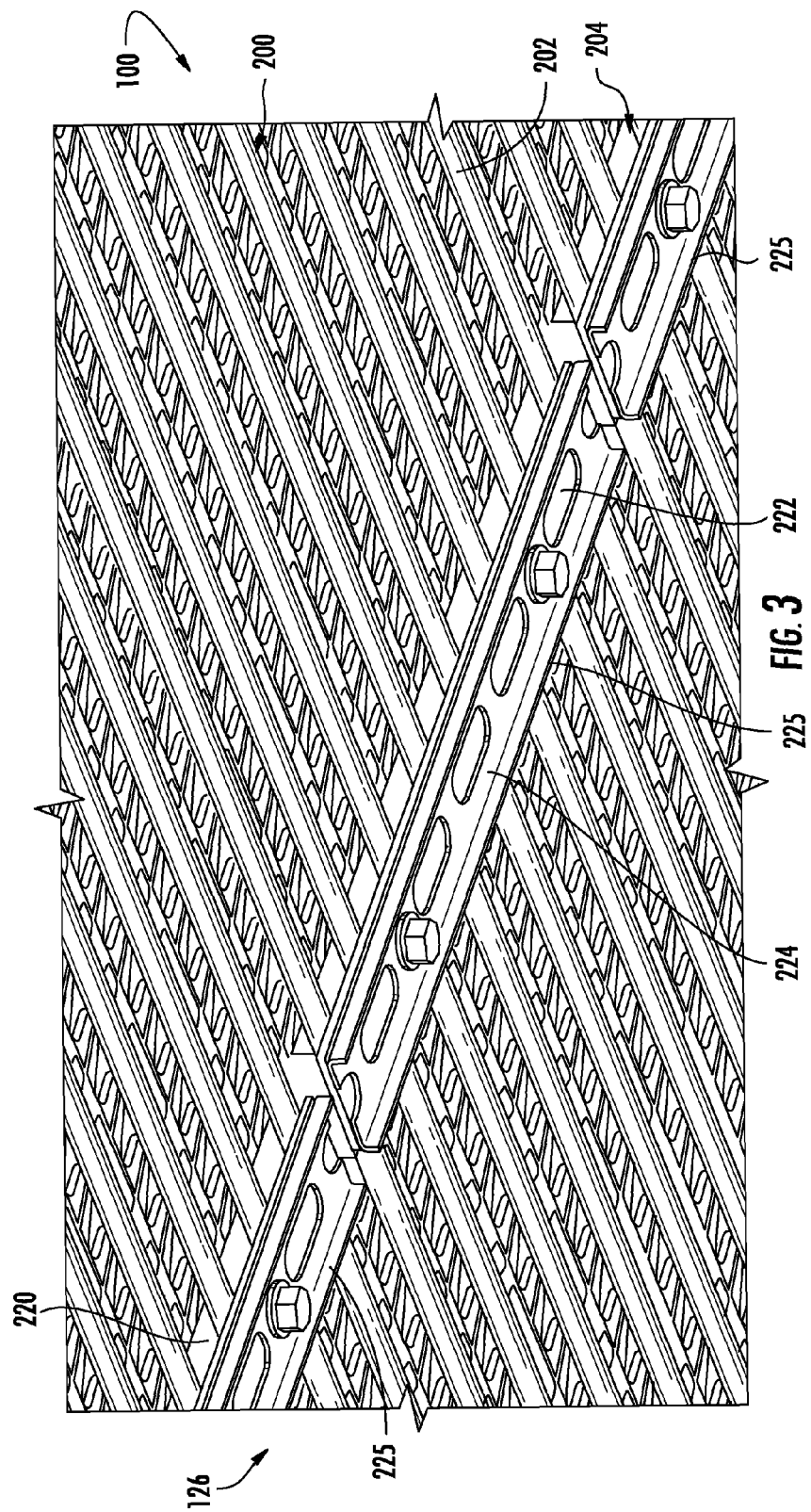
FIG. 3 is a bottom perspective view of a portion of a sieve of the example cleaning system of FIG. 2.

As further shown by FIGS. 2 and 3, sieve 128 comprises louvers 200, louver wires 202 (shown in FIG. 3) and louver wire retention system 204. Louvers 200 comprise angle/or strips supported at predefined spacings or intervals such that clean grain may pass through and between such intervals and such that the lighter and potentially larger chaff is blocked or is lifted and blown rearwardly by the airflow produced by fan or blower 129. In the example illustrated, louvers 200 comprise teeth further interrupting such intervals to further impede the passage of chaff and larger materials other than grain.

Louver wires 202 are connected to each of louvers 200 and extend between transversely spaced sections of louver wire retention system 204. Louver wires 202 support louvers 200. In addition, louver wires 202 are shaped and connected to louvers 200 such that rotation of louver wires 202 further results in rotation of louvers 200, facilitating adjustment of the angle of louvers 200 as well as the size of the openings provided by the intervals between the louvers 200 to accommodate different crops in different field conditions.

Louver wire retention system 204 locates and supports louver wires 202. Louver wire retention system 204 further facilitates rotation of wires 202 to adjust the angular orientation of louvers 200. As will be demonstrated below, louver wire retention system 204 may be fabricated at a lower cost and may facilitate easier repair or replacement of portions of a harvester sieve. Although cleaning system 126 and louver wire retention system 204 have been described above with respect to harvester 100, a rotary combine, in other implementations, cleaning system 126 and louver wire retention system 204 may likewise be utilized in other types of harvesters, such as harvester that threshed the grain in other fashions. For example, cleaning system 126 and louver wire retention system 204 may likewise be utilized in a straw walker harvesters or combines.

Figure 4:
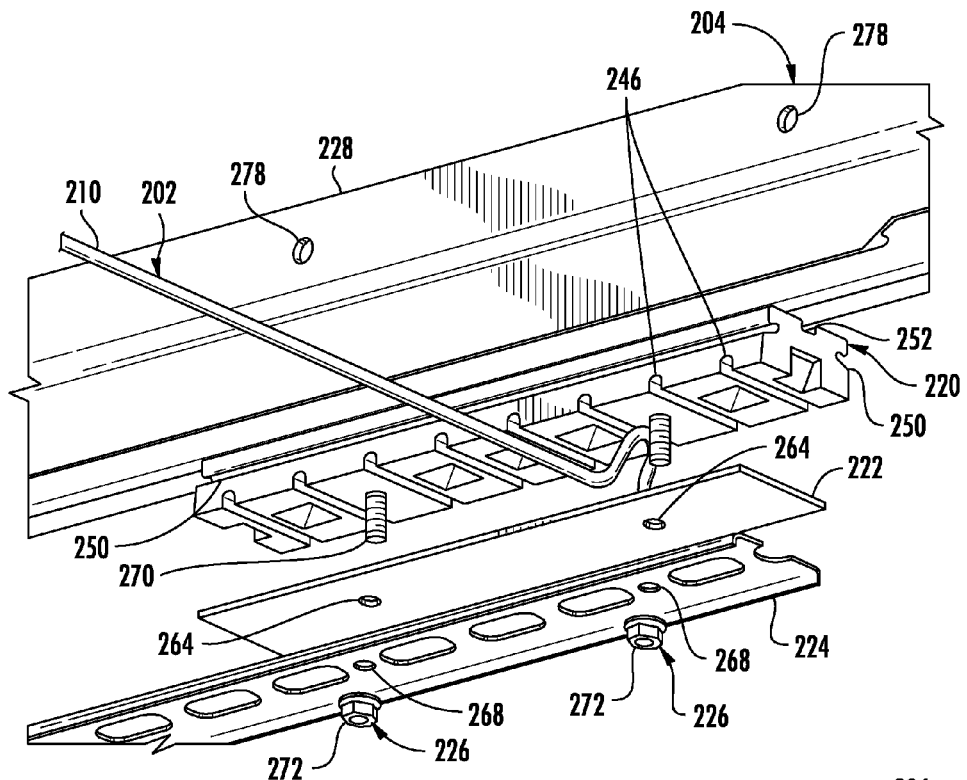
FIG. 4 is an exploded perspective view of an example louver wire and an example louver wire retention system of the seive of FIG. 3.
Figure 5:
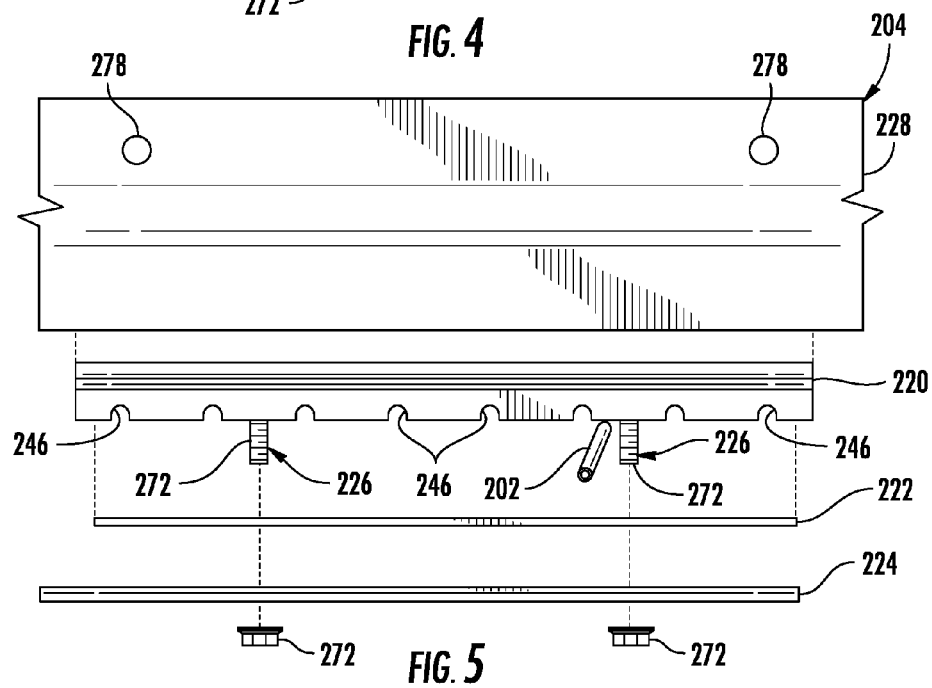
FIG. 5 is an exploded side view of the example louver wire in the example louver wire retention system of the seive of FIG. 3.
Figure 6:
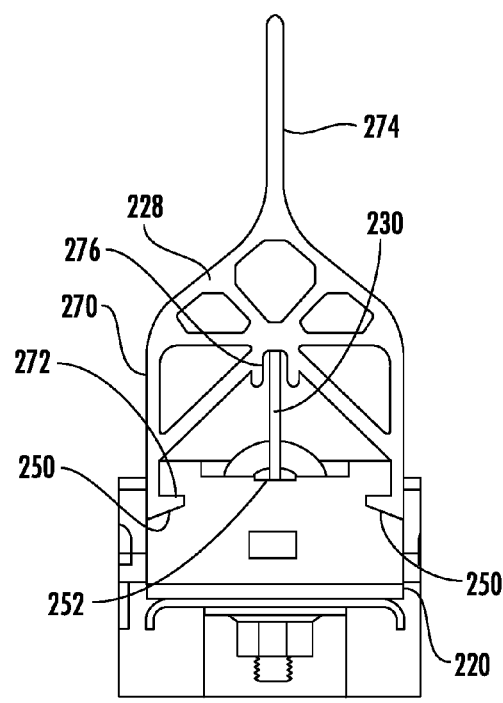
FIG. 6 is a cross-sectional view of the example louver wire retention system supporting example louver wires.
Figure 7:
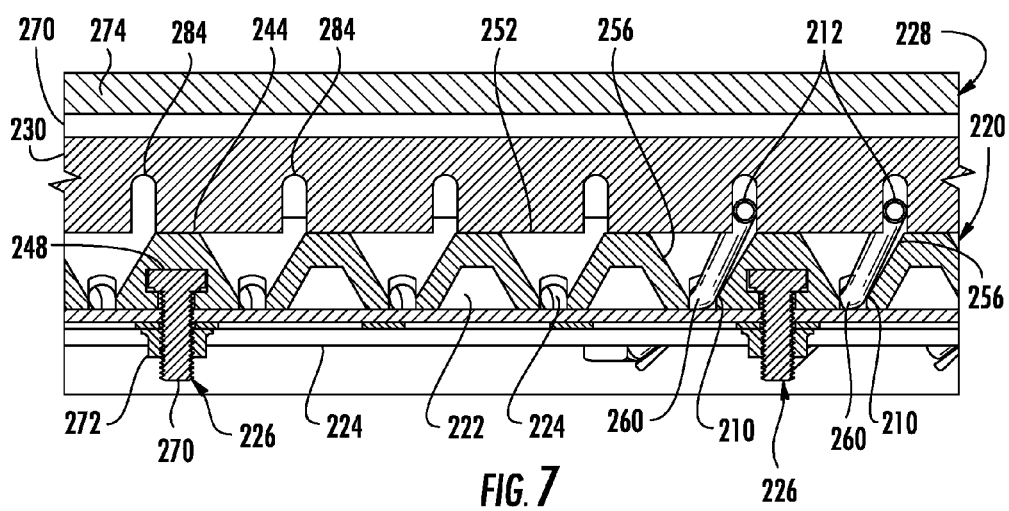
FIG. 7 is a sectional view of the example louver wire retention system supporting example louver wires.

FIGS. 4-7 illustrate portions of louver wire retention system 204 in more detail. FIGS. 4 and 5 depict a single example louver wire 202. FIGS. 6 and 7 illustrate two of such louver wires 202 to illustrate the interaction between louver wire retention system 204 and each of louver wires 202. As shown by FIG. 4, each louver wire 202 comprises a main portion 210 and a lever portion 212. Main portion 210 comprises a generally straight portion which extends across sieve 128 between transversely spaced portions of louver wire retention system 204. Main portion 210 comprises that portion of wire 202 that is connected to or joined to a corresponding louver 200. Lever portion 212 comprises a bent, angled or offset portion of wire 202 which serves as a lever for rotating wire 202 generally about the centerline or axis of main portion 210.

Figure 8:
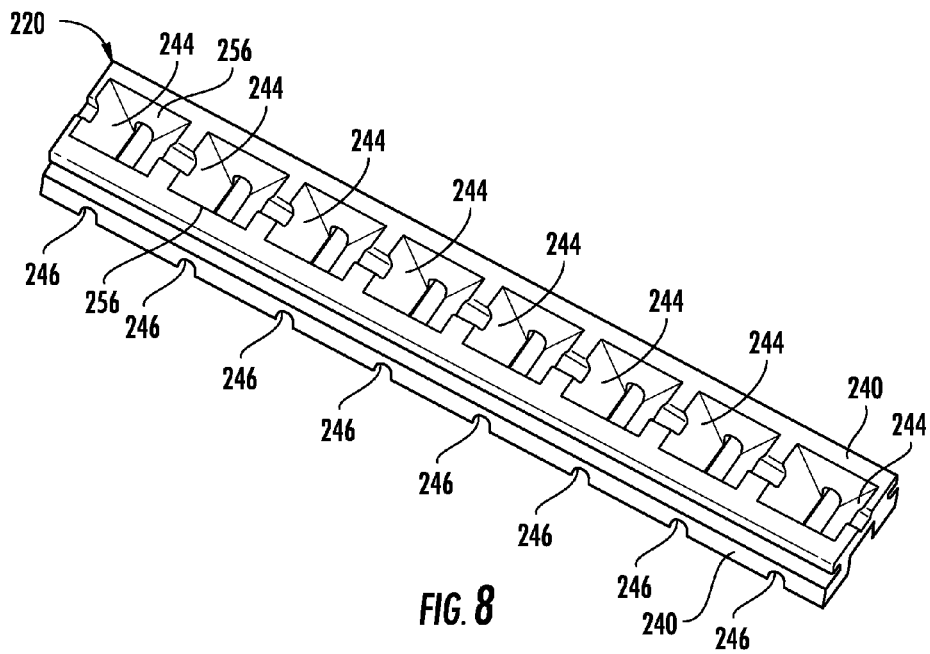
FIG. 8 is a top perspective view of an example bar of the example louver wire retention system of FIG. 4.

As shown by FIGS. 4-7, louver wire retention system 204 comprises bar 220, retainers 222, 224, retainer mounts 226, bar support 228 and adjustment arm 230 (shown in FIGS. 6 and 7). Bar 220 comprises an elongate structure that positions and supports louver wires 202 at spaced apart locations along its longitudinal length. Bar 220 receives lever portion 212 while locating and positioning main portion 210. In the example illustrated, bar 220 further guides movement of adjustment arm 230. FIG. 8 illustrates bar 220 in more detail. As shown by FIG. 8, bar 220 comprises rails 240, rungs 244, slots 246, mount cavities 248, channels 250, and channel 252.

Rails 240 extend along opposite sides of bar 220 longitudinally along bar 220. Rungs 242 extend between rails 240 and are spaced apart from one another at predefined intervals to form intervening pockets 256 longitudinally along bar 220. As shown by FIG. 7, pockets 256 receive lever portions 212 of corresponding louver wires 202. Pockets 256 are sufficiently large and the longitudinal direction to facilitate pivoting of lever portions 212 to a sufficient extent so as to rotate main portions 210 about their respective axes 260 to sufficiently pivot or rotate louvers 200 (shown in FIG. 2) between different angular orientations or positions. In the example illustrated, as seen in FIG. 7, pockets 256 each have V-shaped cross-sections such that the interior surface of pockets 256 contact a large portion of lever portions 212 when lever portions 212 are pivoted to their extreme positions. In other implementations, pockets 256 may have other shapes. For example, in other implementations, pockets 256 have oval, rounded or rectangular cross-sections, wherein the upper portions of such pockets contact or abut lever portion 212 to serve as stops for wires 202 in their extreme rotated positions.

Slots 246 extend within rails 240 from a bottom side of rails 240 so as to face in a downward direction, towards the underlying ground when mounted as part of harvester 100. Slots 246 are each sized to receive a portion of main portion 210 so as to longitudinally retain louver wires 202 and such that watching the forces exerted against lever portion 212 pivot main portions 210 within slots 246. In the example illustrated, slots 246 are each substantially centered within each of pockets 256 such that lower portions of lever portion 212 of each louver wire 202 is also centered within its respective pocket 256.

Mount cavities 248 (shown in FIG. 7) comprise cavities formed within rails 244 between pockets 256. Mount cavities 248 receive portions of retainer mounts 226. In one implementation, mount cavities 248 inhibit rotation of such received portions of retainer mounts 226 to facilitate fastening and tightening of retainer mounts 226. In the example illustrated, mount cavities 248 completely enclose and encapsulate such received portions of retainer mounts 226 such that the received portal 226 cannot be separated from bar 220 and potentially lost or misplaced. For example, in one implementation, bar 220 is molded about such received portions so as to encapsulate the received portions of retainer mounts 226. In yet another implementation, mount cavities 248 have mouths from one or both sides of bar 220 facilitating those received portions of retainer mounts 226 to be inserted are slid into such cavities from the side of bar 220. In yet other implementations, mount cavities 248 may be omitted where other mechanisms are utilized to secure retainer 222 and/or 224 to bar 220.

Channels 250 comprise elongate channels or grooves extending into exterior transverse sides of each of rails 240. Channels 250 extend along the entire length of bar 220. As shown by FIG. 6, channels 250 facilitate sliding securement of bar support 228 to bar 220. As a result, bar support 228 may be releasably mounted to bar 220 without the need for fasteners or the like. Moreover, bars part 220 may be separated from or disassembled from bar 220 to facilitate repair or replacement of bar support 228 and/or bar 220. In other implementations, channels 250 may have other configurations or may be omitted where other mechanisms are utilized to releasably secure bar support 228 to bar 220.

Channel 252 comprises an elongate channel extending along and across each of the spaced rungs 244. In the example illustrated, channel 252 is generally centered between rails 240. As shown by FIGS. 6 and 7, channel 252 slidably receives adjustment arm 230 to guide reciprocal movement of arm 230. In other implementations, channel 252 may be omitted.

As shown by FIG. 8, in the example illustrated, bar 220 is integrally formed as a single unitary body. In one implementation, bar 220 is integrally formed as a single unitary body out of a single polymer. In one implementation, bar 220 comprises a single molded object. In other implementations, bar 220 may be formed from other materials such as a metal or a combination of different metals or polymers. In some implementations, bar 220 may alternatively be formed from multiple components welded, bonded, fastened or mechanically snapped to one another.

Retainer 222 comprises a structure secured to an underside of bar 220 by retainer mounts 226, capturing each of louver wires 202 between retainer 222 and bar 220. In the example illustrated, retainer 222 captures and retains each of louver wires 202 within a corresponding one of slots 246. Retainer 222 comprises openings 264 to facilitate the passage of retainer mounts 226. In the example illustrated, retainer 222 comprises a plate for from material having a low coefficient of friction with main portion 210 of louver wires 202 to facilitate rotation of the wires 202. In one implementation, retainer 222 comprises a plate of a polymer material. In other implementations, retainer 222 may comprise a plate of a metal or of other materials.

Retainer 224 comprises a stiffening plate positionable against retainer 222 to strengthen and stiffen retainer 222. In one implementation, retainer 224 comprises a stamped metal plate having openings 268 to facilitate passage of retainer mounts 226. In some implementations, retainer 224 may be omitted.

Retainer mounts 226 comprise mechanisms to releasably secure retainer 222 and 224 against an underside of bar 220 so as to capture louver wires 202 within bar 220 with lever portions 212 within corresponding pockets 256. In the example illustrated, each of retainer mounts 226 comprises a fastener comprising a threaded bolt 270 and a threaded nut 272. In the example illustrated, the head of bolt 270 is received within cavity 248 of the shaft of bolt 270 projects from bar 220, through openings 264 and 268 into threaded engagement with nut 272 on an underside of retainer 224. In the example illustrated, bar 270 is molded about the head of bolt 270, encompassing and capturing the head in place, reducing the number of parts. In another implementation, this relationship may be reversed with bar 220 being molded about nut 272 with an opening through which the shaft of bolt 270 extends into threaded engagement with the encapsulated nut 272. In some implementations, bolt 270 and/or nut 272 may be omitted where the corresponding external threads or internal threads of bolt 270 and/or nut 272 alternatively formed directly in the material of bar 220 or the material of retainer 224.

In yet other implementations, retainer mount 226 may have other configurations. For example, in other implementations, retainer mount to 26 may alternatively comprise a pair of elongated tracks, grooves or channels along opposite sides of rails 240, wherein the pair of opposing channels slidably receive the plate of retainer 222 and/or 224, capturing louver wire 202 in place within slots 246. In yet other implementations, retainer mount 226 may alternatively comprise opposite tongues extending from rails 240 which are received within corresponding opposing grooves provided in retainer 222 and/or 224, also facilitating sliding securement of retainers 224, 224 to bar 220. In yet other implementations, retainer mounts 226 may comprise resiliently flexible catches or hooks, formed on one of bar 220 and retainer 224, that resiliently flex and snap into corresponding hooks, catches, rings or detents formed on the other of bar 220 or retainer 224. In some implementations, retainers 222, 224 may alternatively held in place by being alternatively mounted directly to bar support 228, with bar 220 captured therebetween.

As illustrated by FIGS. 6 and 7, retainer mounts 226 bear against an underside of bar 220 to form a floor below wires 202. As a result, retainer mounts 226 may facilitate easier repair or replacement of louvers 200 and their associated louver wires 202. For example, to remove a louver 200 or its louver wire 202, retainer mounts 226 are simply unfastened, allowing retainers 222 224 to be separated from the underside of bar 220. Retainer wires 202 may simply fall out of slots 246. Adjustment arm 230 remains in place, supported above bar 220.

As illustrated by FIG. 3, retainers 222 and/or 224 are provided in sections or segments 225. Segments 225 extend along only a portion of the total longitudinal length of sieve 128. Segments 225 facilitate separation of an individual segment 225 or selected segments 225, allowing only a portion of the total number of louver wires 202 and louvers 200 having to be removed or replaced at a time. As indicated above, in some implementations, retainers 222, 224 may alternatively be slidably mounted to the underside of bar 220, wherein such retainers 222, 224 may be slid a sufficient distance to access and withdraw only those individual louver wires 202 and louvers 200 that need to be removed.

Figure 9:
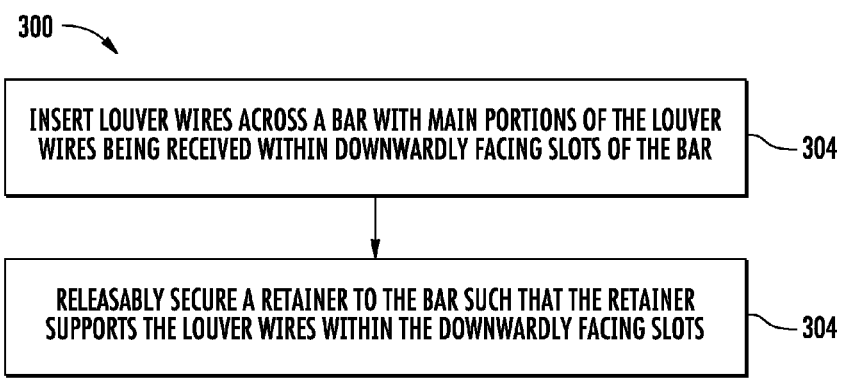
FIG. 9 is a flow diagram of an example method for mounting a louver and associated louver wire as part of a sieve of a harvester cleaning system.

Likewise, retainers 222 and 224 further facilitate easier insertion of new louver wires 202 and their associated louvers 200. FIG. 9 is a flow diagram of an example method 300 for mounting a louver and associated louver wire as part of a sieve of a harvester cleaning system. Although method 300 is described in the context of being carried out with louver 200, wire 202 and louver wire retention system 204, it should be appreciated that method 300 may also be carried out with other similarly functioning louver wire retention systems.

As indicated by block 304, louver wires 202 are inserted across bar 220 with main portions 210 of louver wires 202 being received within downwardly facing slots 246 of bar 220. As indicated by block 306, the retainer, such as retainer 222 and/or retainer 224 is releasably secured to bar 220 such that the retainer 222 and/or 224 supports louver wires 202 within the downwardly facing slots 246. As shown by FIG. 7, retainers 222 and/or 224 further support lever portions 212 within their respective pockets 256 for pivotal actuation by adjustment arm 230.

Bar support 228 comprises a structure removably mounted to bar 220. Bar support 228 rigidifies the luncheon a length of bar 228, inhibiting bending of bar 228. Bar support 228 further facilitates the mounting of suspension system 2042 other supporting structures of harvester 100. In the example illustrated, bar support 228 further guides translational movement of adjustment arm 230.

As shown by FIG. 6, bar support 228 comprises wings 270, tongues 272, spine 274 and channel 276. Wings 270 extend from spine 272 to opposite sides of bar 220. Tongues 272 comprise projections extending inwardly from wings 270. Tongues 270 are slidably received within grooves 250 of bar 220 to releasably mount support 228 to bar 220.

Spine 274 extends from wings 270. Spine 274 provides a plate for mounting and suspending suspension system 204 within harvester 100. In the example illustrated, spine 274 comprises mounting openings 278 (shown in FIGS. 4 and 5). Spine 274 further assist in diverting grain and chaff to either side of spine 274, onto louvers 200 (shown in FIG. 2).

Channel 276 comprises an elongate groove extending along a longitudinal length of support 228, facing bar 220. Channel 276 faces in a downward direction, facing bar 220. Channel 276 slidably receives an upper edge of adjustment arm 230.

Adjustment arm 230 comprises a bar operably coupled to each of lever portions 212 of louver wires 202. In the example illustrated, adjustment arm 230 comprises multiple longitudinally spaced slots 284 which correspond to lever portions 212 so as to receive lever portions 212. Adjustment arm 230 is slidable or movable in a longitudinal direction along the length of bar 220 and bar support 228 to translate lever portions 212 to thereby pivot louver wires 202 and their associated louvers 200 about axes 260 (shown in FIG. 7). In the example illustrated, adjustment arm 230 is slidably guided and captured within and between channel 252 of bar 220 and channel 276 of bar support 228.

In the example illustrated, main portions 210 of louver wires 202 are received within downwardly facing slots 246 lever portions two and 12 projecting upward through the floor of pocket 256 into pockets 256. As indicated above, such the construction allows louver wires 202 to be removed from slots 246 with the assistance of gravity. In other implementations, louver wire retention system 204 may have other configurations. For example, in other implementations, louver wire retention system 204 may be inverted. In other implementations, slots 246 may alternatively comprise upwardly facing slots extending into the upper surface of rails 240, wherein main portions 210 of louver wires 202 rest within the upwardly facing slots and wherein lever portions 212 extend outwardly and are suspended within their associated pockets 256. In such an implementation, such pockets 256 may be rectangular or may have an inverted V-shaped cross-section. In such an implementation, adjustment arm 230 would likewise be inverted, extending below bar 240 with upwardly facing slots 284 receiving lever portions 212.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A harvester cleaning system comprising:
   louvers;
   a bar comprising:
     spaced rails;
     rungs between the rails, rungs forming pockets along the bar;
   louver wires connected to the louvers, each of the louver wires having a main portion about which the louver wire pivots and a lever portion received within one of the pockets; and
   an adjustment arm having slots receiving the lever portion of each of the louver wires, the adjustment arm being movable to pivot the louver wires to pivot the louvers.

2. The system of claim 1, wherein each of the pockets has a V-shaped interior.

3. The system of claim 1 further comprising a retainer removably coupled to the bar below the main portions to vertically support the lever portions within the pockets.

4. The system of claim 1 further comprising a retainer fastened to the bar with the main portions captured between the retainer and the bar, the retainer supporting the lever portions within the pockets.

5. The system of claim 1 further comprising:
   a retainer sandwiching the wires between the retainer and the bar, the retainer supporting the lever portions within the pockets; and
   one of a nut and a bolt to receive the other of a bolt and a nut captured in one of the rungs so as to fasten the retainer to the bar.

6. The system of claim 1, wherein the bar comprises slots receiving the main portion of each of the wires.

7. The system of claim 1, wherein the bar comprises a channel slidably receiving the adjustment arm to guide movement of the adjustment arm.

8. The system of claim 1 further comprising a bar support slidably supporting the bar.

9. The system of claim 1 comprising a bar support slidably supporting the bar, the bar support comprising a first channel facing a first direction and slidably receiving the adjustment arm, the bar comprising a second channel facing in a second direction slidably receiving the adjustment arm.

10. The system of claim 1 further comprising a bar support slidably supporting the bar, the bar support being symmetrical along a longitudinal axis to facilitate fabrication through extrusion.

11. The system of claim 1 further comprising a bar support slidably supporting the bar, the bar support comprising a channel facing the bar and slidably receiving the adjustment arm to guide movement of the adjustment arm.

12. The system of claim 1, wherein the bar comprises a single integrally formed unitary body.

13. The system of claim 1, wherein the bar comprises a single integral unitary polymeric body.

14. The system of claim 1, wherein the adjustment arm extends on a first side of the bar and wherein the bar comprises slots receiving the main portions of the wires, the slots facing away from the first side.

15. A harvester cleaning system comprising:
louvers;
a bar having opposite sides and slots;
louver wires connected to the louvers, each of the louver wires having a main portion received within one of the slots about which the louver wire pivots and a lever portion received between the opposite sides of the bar;
an adjustment arm having slots receiving the lever portion of each of the louver wires, the adjustment arm being movable to pivot the louver wires to pivot the louvers; and
a retainer sandwiching the wires between the retainer and the bar, the retainer supporting the main portions within the slots.

16. The system of claim 15, wherein the bar comprises rungs between the rails, the system further comprising
one of a nut and a bolt to receive the other of a bolt and a nut captured in one of the rungs so as to fasten the retainer to the bar.

17. The system of claim 15, wherein the bar comprises a channel slidably receiving the adjustment arm to guide movement of the adjustment arm.

18. The system of claim 15 further comprising a bar support slidably supporting the bar.

19. The system of claim 15 comprising a bar support slidably supporting the bar, the bar support comprising a first channel facing a first direction and slidably receiving the adjustment arm, the bar comprising a second channel facing in a second direction slidably receiving the adjustment arm.

\* \* \* \* \*